United States Patent [19]

Wagener et al.

[11] Patent Number: 4,512,080
[45] Date of Patent: Apr. 23, 1985

[54] METHOD AND APPARATUS FOR MEASURING THE FLEXURE OF A HEATING WALL OF A COKE OVEN DURING OPERATION THEREOF

[75] Inventors: Dietrich Wagener; Manfred Blase, both of Essen, Fed. Rep. of Germany

[73] Assignee: Didier Engineering GmbH, Essen, Fed. Rep. of Germany

[21] Appl. No.: 548,426

[22] Filed: Nov. 3, 1983

[30] Foreign Application Priority Data

Nov. 16, 1982 [DE] Fed. Rep. of Germany ....... 3242338

[51] Int. Cl.³ .............................................. G01B 21/16
[52] U.S. Cl. .............................. 33/125 T; 33/DIG. 19; 201/1; 202/268
[58] Field of Search ............. 33/1 R, DIG. 19, 125 T; 202/81, 270, 282, 292, 268, 151; 201/1; 374/187, 202, 149, 141, 205

[56] References Cited

U.S. PATENT DOCUMENTS

| | | | |
|---|---|---|---|
| 2,637,685 | 5/1953 | Petit | 202/268 |
| 3,133,689 | 5/1964 | Wethly | 201/1 |
| 3,300,391 | 1/1967 | Bower | 202/268 |
| 3,506,542 | 4/1970 | Kulakov | 201/1 |
| 4,347,106 | 8/1982 | Wackerbarth | 202/270 |
| 4,445,977 | 5/1984 | Husher | 202/268 |

FOREIGN PATENT DOCUMENTS

| | | |
|---|---|---|
| 243004 | 1/1912 | Fed. Rep. of Germany . |
| 1278758 | 9/1968 | Fed. Rep. of Germany . |

Primary Examiner—Willis Little
Attorney, Agent, or Firm—Wenderoth, Lind & Ponack

[57] ABSTRACT

The amount of flexure of a heating wall of a coke oven is determined during operation of the coke oven by providing an observation hole through the oven roof into a heating flue, the observation hole having an axis. On at least one of the binder walls defining the heating flue is formed a vertical measuring strip extending throughout substantially the entire height of the binder wall at a position to be visible through the observation hole. The measuring strip defines, prior to heating during operation of the coke oven, a rectilinear reference line extending parallel to and spaced from the axis of the observation hole. Upon operation of the coke oven, during which time the heating wall is heated and flexes, the degree of such flexure is determined by measuring through the observation hole the extent of deviation of the measuring strip from the reference line.

20 Claims, 7 Drawing Figures

METHOD AND APPARATUS FOR MEASURING THE FLEXURE OF A HEATING WALL OF A COKE OVEN DURING OPERATION THEREOF

BACKGROUND OF THE INVENTION

The present invention relates to a method and apparatus for measuring the flexure of a heating wall of a coke oven during operation of the coke oven.

"Stahl and Eisen" Volume 79 (1959), pages 397–405 and specifically page 402, describes tests to empirically compare with theoretical calculations the load limit of a vertical coke oven wall section, with respect to chamber filling. This type of testing installation is unsuitable however for attempting to carry out measurements during operation of a coke oven.

However, the measurement of the degree or extent of flexure of heating walls of a coke oven during operation thereof is very useful in determining the stress exerted upon the heating walls during refining of coal and during formation of coke. By such information obtained during operation of the coke oven it would be possible to determine the relationship of flexure to the coal employed, the packing density and the relative speed of the coking operation.

SUMMARY OF THE INVENTION

With the above discussion in mind, it is the object of the present invention to provide an improved method and apparatus or arrangement for measuring, simply and accurately, the extent or degree of flexure of a heating wall of a coke oven during a coking operation. The coke oven is of the type having coke oven chambers separated by a heating wall having therein at least one heating flue defined by stretcher and binder walls of the heating wall and an oven roof covering the coke oven chambers and the heating flue.

The above object is achieved in accordance with the present invention by providing an observation hole through the oven roof into the heating flue with the observation hole having an axis. At least one vertical measuring strip or observable flexurable band is formed on at least one of the binder walls and extends throughout substantially the entire height thereof at a position to be visible through the observation hole. The measuring strip defines, prior to heating of the heating wall during operation of the coke oven, a rectilinear measuring line or reference line extending parallel to and spaced from the axis of the observation hole. Upon heating of the heating wall during operation of the coke oven the binder wall will be flexed, and accordingly the measuring strip similarly will be flexed. The degree of flexure of the heating wall is determined by observation through the observation hole by measuring the extent of deviation of the measuring strip from the measuring line. Specifically, the mid-line or portion of the measuring strip defines the measuring line, and the measuring strip is visible throughout substantially the entire length thereof when viewed obliquely from above through the observation hole.

The measuring strip may be formed in a number of ways. Specifically, the measuring strip may comprise a coating of a heat resistant dye applied to the bricks of the binder wall or a band of heat resistant material applied to the binder bricks. Furthermore, the measuring strip may be formed by vertically aligned butt joints of the binder bricks forming the binder wall. Even further, the measuring strip may comprise vertically aligned projections extending from the binder bricks, or by vertically aligned recesses formed in the binder bricks. These possibilities are intended to be exemplary only, and not limiting to the scope of the present invention.

In accordance with a preferred feature of the present invention, the measuring strip has a predetermined width serving as a measuring indicia of the deviation. In other words, the predetermined width of the measuring strip may serve as a "yard-stick" for measuring the deviation. In this way, the deviation, that is the amount of flexure of the heating wall, can be read with the naked eye quite simply as a multiple of the width of the measuring strip.

In accordance with a further feature of the present invention, there may be provided an optical device such as a theodolite and/or a camera for measuring and/or recording the deviation through the observation hole. Thereby, it is possible to make more precise measurements of the deviation and/or to record the flexure pattern of the heating wall during operation of the coke oven.

BRIEF DESCRIPTION OF THE DRAWINGS

Other objects, features and advantages of the present invention will become apparent from the following detailed description thereof, with reference to the accompanying drawings, wherein.

DETAILED DESCRIPTION OF THE INVENTION

Figure 1:
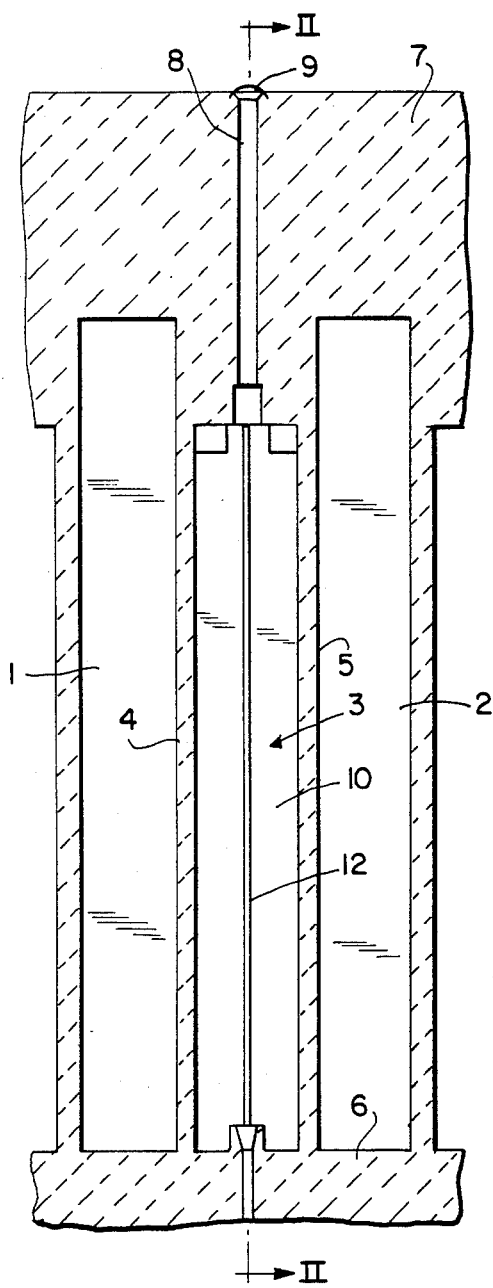
FIG. 1 is a vertical sectional view through adjacent coke oven chambers separated by a heating wall in accordance with a first embodiment of the present invention.
Figure 2:
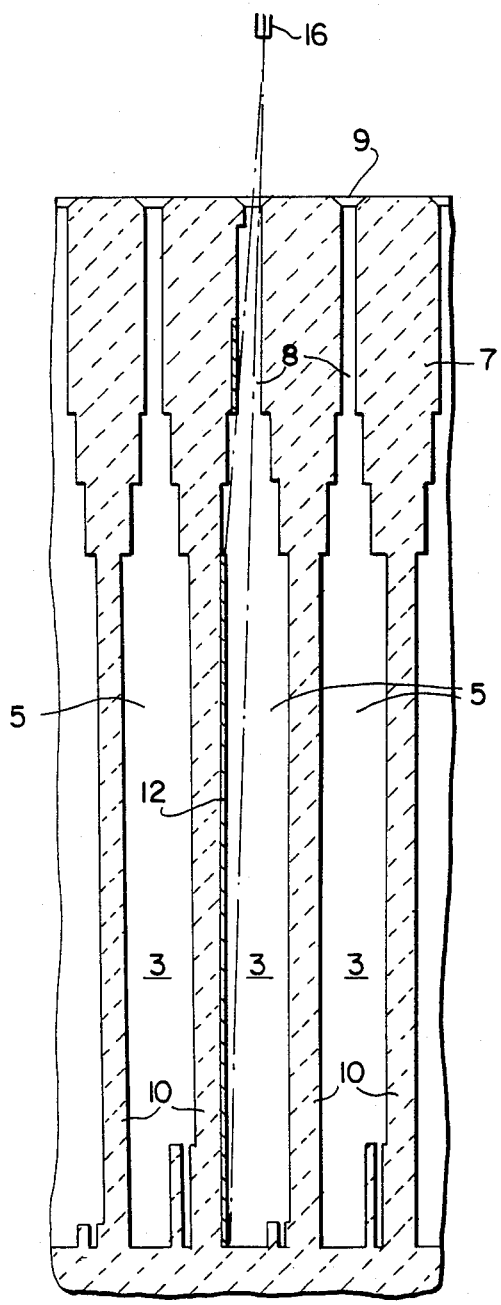
FIG. 2 is a vertical sectional view taken along line II—II of FIG. 1.

FIGS. 1 and 2 represent a portion of a coke oven having therein two adjacent coke oven chambers 1, 2 separated by a heating wall having therein a plurality of heating flues 3 which are defined by stretcher walls 4, 5 and by binder walls 10. Thus, the heating wall is formed by stretcher walls 4, 5 and binder walls 10 defining vertically extending heating flues 3. The coke oven also has an oven roof 7 and a bottom or base 6. This construction in and of itself is not novel, and it is intended that the concept of the present invention be applicable to this and to all other known types of internal construction of coke ovens.

In accordance with the present invention, an observation hole 8 is formed in oven roof 7 to allow observation internally of at least one of the heating flues 3. Observation hole 8 has a vertical axis.

A vertical measuring strip or flexurable band 12 is formed on one of the binder walls 10 and extends throughout substantially the entire height thereof at a position to be visible through observation hole 8. Measuring strip 12 defines, prior to heating of the heating wall during operation of the coke oven, a rectilinear measuring line or reference line 11 extending parallel to and spaced from the axis of observation hole 8. Measuring line 11 preferably may be defined by the vertical center of the measuring strip 12 prior to flexure thereof and of the heating wall. The measuring strip 12 shown in FIGS. 1 and 2 may be a coating of heat resistant dye or a band of heat resistant material.

Upon operation of the coke oven the heating wall will be heated and as a result the binder wall 10 will be flexed. During flexure of the binder wall 10, measuring strip 12 will flex by the same extent. Observation hole 8 is covered by an optically transparent lid 9, and the degree of flexure of the heating wall may be determined by the extent of deviation of measuring strip 12 from measuring line 11, for example by means of a measuring instrument 16. Thus, during the entire operation of the coke oven, the extent of flexure of the heating wall may be determined and/or measured.

Figure 3:
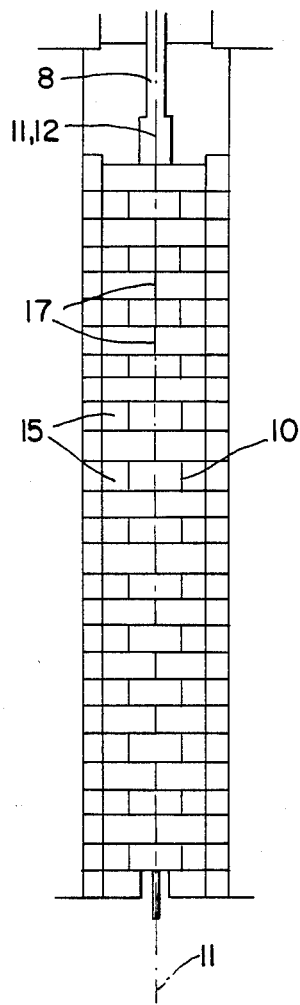
FIGS. 3 and 4 are elevation views of portions of binder walls illustrating further embodiments of the present invention.

In accordance with the embodiment of FIG. 3, the vertical measuring strip 12 and corresponding initial measuring or reference line 11 are defined by butt joints 17 of binder bricks 15 which form the binder wall 10. Thus, butt joints 17 are vertically aligned at a position laterally of the axis of observation hole 8 and extend parallel to such axis. In the illustrated embodiment, butt joints 17 are formed by alternate layers of bricks, but this is intended to be exemplary only.

Figure 4:
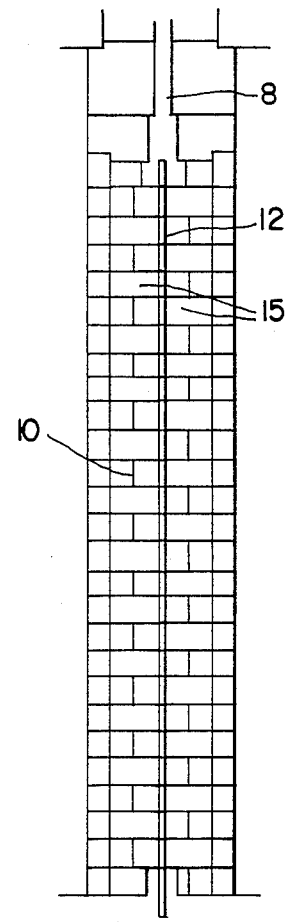
Figure 5:
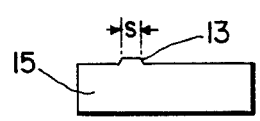
FIGS. 5 and 6 are plan views, on an enlarged scale, of binder bricks employed in the embodiment of FIG. 4.
Figure 6:
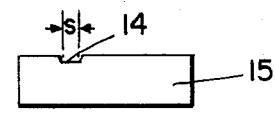

FIG. 4 illustrates a further embodiment of the present invention wherein the measuring strip 12 and reference or measuring line 11 are defined by vertically aligned projections extending from or recesses formed in binder bricks 15 forming binder wall 10. Thus, projections 13 are illustrated in FIG. 5, and recesses 14 are illustrated in FIG. 6. FIG. 4 illustrates the projections or recesses being vertically continuous, but this is intended to be exemplary only.

Figure 7:
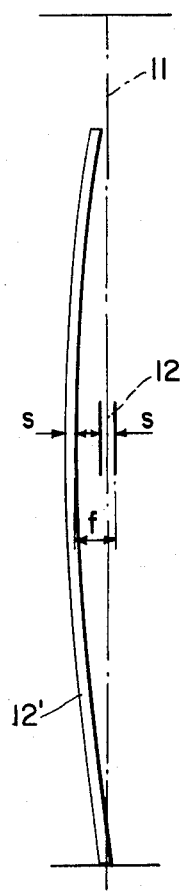
FIG. 7 is a schematic diagram representing the manner of operation of the present invention.

FIG. 7 schematically illustrates a manner of carrying out the present invention in a simple manner. Thus, the measuring strip 12 is provided with a predetermined width s which may serve as a measuring indicia of the deviation f to be determined or measured. Thus, FIG. 7 illustrates the position 12' of the measuring strip after flexure of the heating wall. The deviation f easily may be determined by the naked eye by a comparison with the predetermined width s.

In accordance with a further feature of the present invention however the optical device 16 may be in the form of a theodolite to more precisely measure the deviation and/or a camera for recording such deviation.

Although the present invention has been described and illustrated with respect to preferred features and embodiments thereof, it is to be understood that various modifications and changes may be made to the specifically described and illustrated features without departing from the scope of the present invention.

We claim:

1. In a coke oven of the type having coke oven chambers separated by a heating wall having therein at least one heating flue defined by stretcher and binder walls of said heating wall, and an oven roof covering said coke oven chambers and said heating flue, wherein during operation of said coke oven said heating wall is flexed, the improvement of means for determining during operation of said coke oven the amount of flexure of said heating wall, said determining means comprising:
    an observation hole through said oven roof into said heating flue, said observation hole having an axis;
    at least one vertical measuring strip formed on at least one of said binder walls and extending throughout substantially the entire height thereof at a position to be visible through said observation hole; and
    said measuring strip defining, prior to heating of said heating wall during operation of said coke oven, a rectilinear measuring line extending parallel to and spaced from said axis of said observation hole;
    whereby, upon heating of said heating wall during operation of said coke oven said binder wall will be flexed, and the degree of such flexure may be determined by the extent of deviation of said measuring strip from said measuring line.

2. The improvement claimed in claim 1, wherein said measuring strip comprises a coating of heat resistant dye.

3. The improvement claimed in claim 1, wherein said measuring strip comprises a band of heat resistant material.

4. The improvement claimed in claim 1, wherein said measuring strip comprises vertically aligned butt joints of binder bricks forming said binder wall.

5. The improvement claimed in claim 1, wherein said measuring strip comprises vertically aligned projections extending from binder bricks forming said binder wall.

6. The improvement claimed in claim 1, wherein said measuring strip comprises vertically aligned recesses formed in binder bricks forming said binder wall.

7. The improvement claimed in claim 1, wherein said measuring strip has a predetermined width serving as a measuring indicia of said deviation.

8. The improvement claimed in claim 1, further comprising an optical device such as a theodolite and/or camera for measuring and/or recording said deviation through said observation hole.

9. An arrangement for determining the amount of flexure of a heating wall of a coke oven during operation thereof, such coke oven being of the type having coke oven chambers separated by the heating wall which has therein at least one heating flue defined by stretcher walls and binder walls of the heating wall and an oven roof covering the coke oven chambers and the heating flue, said arrangement comprising:
    an observation hole through the oven roof into the heating flue, said observation hole having an axis;
    at least one vertical measuring strip formed on at least one of the binder walls and extending throughout substantially the entire height thereof at a position to be visible through said observation hole; and
    said measuring strip defining, prior to heating of the heating wall during operation of the coke oven, a rectilinear measuring line extending parallel to and spaced from said axis of said observation hole;
    whereby, upon heating of the heating wall during operation of the coke oven the binder wall will be flexed, and the degree of such flexure may be determined by the extent of deviation of said measuring strip from said measuring line.

10. An arrangement as claimed in claim 9, wherein said measuring strip comprises a coating of heat resistant dye.

11. An arrangement as claimed in claim 9, wherein said measuring strip comprises a band of heat resistant material.

12. An arrangement as claimed in claim 9, wherein said measuring strip comprises vertically aligned butt joints of binder bricks forming the binder wall.

13. An arrangement as claimed in claim 9, wherein said measuring strip comprises vertically aligned projections extending from binder bricks forming the binder wall.

14. An arrangement as claimed in claim 9, wherein said measuring strip comprises vertically aligned recesses formed in binder bricks forming the binder wall.

15. An arrangement as claimed in claim 9, wherein said measuring strip has a predetermined width serving as a measuring indicia of said deviation.

16. An arrangement as claimed in claim 9, further comprising an optical device such as a theodolite and/or camera for measuring and/or recording said deviation through said observation hole.

17. A method for determining the amount of flexure of a heating wall of a coke oven during operation thereof, such coke oven being of the type having coke oven chambers separated by said heating wall which has therein at least one heating flue defined by stretcher walls and binder walls of said heating wall and an oven roof covering said coke oven chambers and said heating flue, said method comprising:
   providing an observation hole through said over roof into said heating flue, with said observation hole having an axis;
   providing on at least one of said binder walls a vertical measuring strip extending throughout substantially the entire height of said binder wall at a position to be visible through said observation hole, with said measuring strip defining, prior to heating of said heating wall during operation of said coke oven, a rectilinear measuring line extending parallel to and spaced from said axis of said observation hole;
   operating said coke oven, whereby said heating wall is heated and thereby flexes; and
   determining the degree of such flexure by measuring through said observation hole the extent of deviation of said measuring strip from said measuring line.

18. A method as claimed in claim 17, further comprising providing said measuring strip with a predetermined width, and employing said width as an indicia of said deviation during said measuring.

19. A method as claimed in claim 17, comprising measuring said deviation by means of an optical device such as a theodolite.

20. A method as claimed in claim 17, further comprising recording said measured deviation by means of an optical device such as a camera.

* * * * *